United States Patent
Curtiss et al.

(10) Patent No.: US 10,459,926 B2
(45) Date of Patent: Oct. 29, 2019

(54) SYSTEMS AND METHODS FOR IMPROVING THE RANKING OF NEWS ARTICLES

(71) Applicant: Google LLC, Mountain View, CA (US)

(72) Inventors: Michael Curtiss, Mountain View, CA (US); Krishna A. Bharat, Palo Alto, CA (US); Michael Schmitt, Zurich (CH)

(73) Assignee: Google LLC, Mountain View, CA (US)

( * ) Notice: Subject to any disclaimer, the term of this patent is extended or adjusted under 35 U.S.C. 154(b) by 864 days.

(21) Appl. No.: 14/696,931

(22) Filed: Apr. 27, 2015

(65) Prior Publication Data

US 2016/0019216 A1 Jan. 21, 2016

Related U.S. Application Data

(63) Continuation of application No. 14/140,108, filed on Dec. 24, 2013, now Pat. No. 9,037,575, which is a (Continued)

(51) Int. Cl.
*G06F 16/2457* (2019.01)
*G06F 16/93* (2019.01)
(Continued)

(52) U.S. Cl.
CPC .... *G06F 16/24578* (2019.01); *G06F 16/2455* (2019.01); *G06F 16/24575* (2019.01);
(Continued)

(58) Field of Classification Search
CPC ........... G06F 17/3053; G06F 17/30011; G06F 17/30477; G06F 17/30528; G06F 17/30864; G06F 17/30867; G06F 16/24578; G06F 16/93; G06F 16/2455; G06F 16/24575; G06F 16/9535; G06F 16/951; Y10S 707/99932; Y10S 707/99933; Y10S 707/99937; Y10S 707/99942; Y10S 707/99943; Y10S 707/99945
(Continued)

(56) References Cited

U.S. PATENT DOCUMENTS 5,293,552 A  3/1994 Aalbersberg
5,724,567 A  3/1998 Rose et al.
(Continued)

FOREIGN PATENT DOCUMENTS

CA  2 443 036  3/2005
EP  1 006 458  12/1998
(Continued)

OTHER PUBLICATIONS

Chen et al., "Computing and Using Reputations for Internet Ratings", ACM, (2001) pp. 154-162.
(Continued)

*Primary Examiner* — Mohammad S Rostami
*Assistant Examiner* — Saba Ahmed
(74) *Attorney, Agent, or Firm* — Fish & Richardson P.C.

(57) ABSTRACT

A system ranks results. The system may receive a list of links. The system may identify a source with which each of the links is associated and rank the list of links based at least in part on a quality of the identified sources.

20 Claims, 5 Drawing Sheets

Related U.S. Application Data continuation of application No. 13/616,659, filed on Sep. 14, 2012, now Pat. No. 8,645,368, which is a continuation of application No. 13/404,827, filed on Feb. 24, 2012, now Pat. No. 8,332,382, which is a continuation of application No. 12/501,256, filed on Jul. 10, 2009, now Pat. No. 8,126,876, which is a continuation of application No. 10/662,931, filed on Sep. 16, 2003, now Pat. No. 7,577,655.

(51) Int. Cl.
    *G06F 16/951*     (2019.01)
    *G06F 16/2455*     (2019.01)
    *G06F 16/9535*     (2019.01)

(52) U.S. Cl.
    CPC ............ *G06F 16/93* (2019.01); *G06F 16/951* (2019.01); *G06F 16/9535* (2019.01); *Y10S 707/99932* (2013.01); *Y10S 707/99933* (2013.01); *Y10S 707/99937* (2013.01); *Y10S 707/99942* (2013.01); *Y10S 707/99943* (2013.01); *Y10S 707/99945* (2013.01)

(58) Field of Classification Search
    USPC ........................................................ 707/726
    See application file for complete search history.

(56) References Cited

U.S. PATENT DOCUMENTS

| | | |
|---|---|---|
| 5,787,420 A | 7/1998 | Tukey et al. |
| 5,907,836 A | 5/1999 | Sumita et al. |
| 5,930,798 A | 7/1999 | Lawler et al. |
| 6,026,388 A | 2/2000 | Liddy et al. |
| 6,119,124 A | 9/2000 | Broder et al. |
| 6,275,820 B1 | 8/2001 | Navin-Chandra et al. |
| 6,453,315 B1 | 9/2002 | Weissman et al. |
| 6,463,265 B1 | 10/2002 | Cohen et al. |
| 6,558,431 B1 | 5/2003 | Lynch et al. |
| 6,594,654 B1 | 7/2003 | Salam et al. |
| 6,601,075 B1 | 7/2003 | Huang et al. |
| 6,647,383 B1 | 11/2003 | August et al. |
| 6,654,742 B1 | 11/2003 | Kobayashi et al. |
| 6,785,671 B1 | 8/2004 | Bailey et al. |
| 6,804,688 B2 | 10/2004 | Kobayashi et al. |
| 6,850,934 B2 | 2/2005 | Bates et al. |
| 6,859,800 B1 | 2/2005 | Roche et al. |
| 6,920,450 B2 | 7/2005 | Aono et al. |
| 6,952,806 B1 | 10/2005 | Card et al. |
| 6,978,267 B2 | 12/2005 | Perisic et al. |
| 6,978,419 B1 | 12/2005 | Kantrowitk |
| 7,080,073 B1 | 7/2006 | Jiang et al. |
| 7,080,079 B2 | 7/2006 | Yu |
| 7,200,606 B2 | 4/2007 | Elkan |
| 7,568,148 B1 | 7/2009 | Bharat et al. |
| 7,577,654 B2 | 8/2009 | Brants et al. |
| 7,577,655 B2 | 8/2009 | Curtiss et al. |
| 8,090,717 B1 | 1/2012 | Bharat et al. |
| 8,126,876 B2 | 2/2012 | Curtiss et al. |
| 8,225,190 B1 | 7/2012 | Bharat et al. |
| 8,332,382 B2 | 12/2012 | Curtiss et al. |
| 8,645,368 B2 | 2/2014 | Curtiss et al. |
| 9,619,527 B2 * | 4/2017 | Bradsher ............ G06Q 30/0253 |
| 2001/0003823 A1 | 6/2001 | Mighdoll et al. |
| 2002/0038430 A1 | 3/2002 | Edwards et al. |
| 2002/0073161 A1 | 6/2002 | Yamazaki et al. |
| 2002/0073188 A1 | 6/2002 | Rawson |
| 2002/0103775 A1 | 8/2002 | Quass et al. |
| 2003/0009496 A1 | 1/2003 | McBrearty et al. |
| 2003/0014383 A1 | 1/2003 | Cho et al. |
| 2003/0061214 A1 | 3/2003 | Alpha |
| 2003/0088554 A1 | 5/2003 | Ryan et al. |
| 2003/0120654 A1 | 6/2003 | Edlund et al. |
| 2003/0182270 A1 | 9/2003 | Kuno et al. |
| 2003/0182310 A1 | 9/2003 | Charnock et al. |
| 2003/0191695 A1 | 10/2003 | Kondo et al. |
| 2003/0212704 A1 | 11/2003 | Turicchi et al. |
| 2003/0220913 A1 | 11/2003 | Doganata et al. |
| 2004/0019846 A1 | 1/2004 | Castellani et al. |
| 2005/0027699 A1 | 2/2005 | Awadallah et al. |
| 2005/0102130 A1 | 5/2005 | Quirk et al. |
| 2005/0203970 A1 | 9/2005 | McKeown et al. |
| 2005/0216443 A1 | 9/2005 | Morton et al. |
| 2005/0289140 A1 | 12/2005 | Ford et al. |
| 2006/0089947 A1 | 4/2006 | Gallivan et al. |
| 2006/0190354 A1 | 8/2006 | Meisel et al. |
| 2006/0253418 A1 | 11/2006 | Charnock et al. |
| 2006/0259476 A1 | 11/2006 | Kadayam et al. |
| 2006/0277175 A1 | 12/2006 | Jiang et al. |
| 2007/0022374 A1 | 1/2007 | Huang |
| 2007/0260586 A1 * | 11/2007 | Savona ................. G06F 16/951 |
| 2008/0077570 A1 * | 3/2008 | Tang ................... G06F 16/3344 |
| 2008/0270393 A1 | 10/2008 | Doganata et al. |
| 2009/0164408 A1 * | 6/2009 | Grigorik ............. G06F 16/9535 |
| 2010/0070486 A1 * | 3/2010 | Punaganti Venkata ...................... G06F 16/248 707/722 |
| 2010/0153404 A1 * | 6/2010 | Ghosh .................... G06Q 30/02 707/748 |
| 2012/0239639 A1 * | 9/2012 | Shriber ............... G06F 17/2247 707/711 |
| 2015/0365447 A1 * | 12/2015 | Klein ..................... G06F 16/00 709/204 |

FOREIGN PATENT DOCUMENTS

| | | |
|---|---|---|
| JP | 8335265 | 12/1996 |
| JP | 10-171819 | 6/1998 |
| JP | 2002-092001 | 3/2002 |
| JP | 2003-248691 | 9/2003 |
| WO | WO 00/77689 | 12/2000 |
| WO | WO 01/46870 | 6/2001 |

OTHER PUBLICATIONS

Office Action from U.S. Appl. No. 10/611,267, dated Oct. 26, 2010, 50 pages.

Johnson et al., "Information Retrieval from Unsegmented Broadcast News Audio", SpringerLink Contemporary, Jul. 2001, pp. 251-268.

Tomlin et al., "A New Paradigm for Ranking Pages on the World Wide Web", ACM, May 2003, pp. 350-355.

Rasolofo et al., "Result Merging Strategies for a Current News Metasearcher", Information Processing and Management, Elsvier Science Publishers, vol. 39, No. 4, Jul. 2003, 29 pages.

Zhang et al., "A Novel Web Usage Mining Approach for Search Engines", Computer Networks, Elsevier Science Publishers, vol. 39, No. 3, Jun. 21, 2002, 8 pages.

Zhang et al., "An Efficient Algorithm to Rank Web Resources", Computer Networks, Elsevier Science Publishers, vol. 33, No. 1-6, Jun. 2000, 7 pages.

Meghabghab, "Stochastic Simulations of Rejected World Wide Web Pages", Proceedings of the 8th International Symposium on Modeling, Analysis and Simulation of Computer and Telecommunication Systems, Aug. 29-Sep. 1, 2000, pp. 483-491.

Henzinger et al., "Query-Free News Search", ACM, May 20-24, 2003, 10 pages.

Egghe et al., "The Influence of Publication Delays on the Observed Aging Distribution of Scientific Literature", 2000, Journal of the American Society of information Science, pp. 158-165.

International Search Report Corresponding to PCT/US2004/030028, dated Feb. 4, 2005, 4 pages.

Sakano, "Revealing the Secrets of [Google wa hitto suru] Dissecting the Search Engine", Internet Magazine, No. 79, Japan, Impress Corporation, Aug. 1, 2001, pp. 222-235.

Harada, "Ranking of the Results in a Search Engine", Bit vol. 32, No. 8, Japan, Kyosan Publishing, Aug. 1, 2000, pp. 8-14.

Suzuki, "Latest State of Web Search Engines", WEB+DB Press., vol. 5, First Publication, Japan, Gijutsu Hyoronsha, Nov. 15, 2001, pp. 108-114.

(56) References Cited

OTHER PUBLICATIONS

Takeda, "Site-Outlining-Internet Information Gathering and Visualization Technology", Information Processing Society of Japan, Fourth vol., No. 8, Aug. 15, 2001, pp. 781-786.
Protest of James Stakelum dated May 7, 2005, 9 pages.
Co-Pending Application, U.S. Appl. No. 13/548,930 entitled "Methods and Apparatus for Clustering News Content", by Bharat et al., filed Jul. 13, 2012, 51 pages.
Co-Pending Application, U.S. Appl. No. 13/299,825 entitled "Methods and Apparatus for Ranking Documents", by Bharat et al., filed Nov. 18, 2011, 42 pages.
The opening paragraph of 3.1 composition of information source in the right column Of the 120th page of "Measuring Similarity among Information Sources by Comparing String Frequency Distributions", Shinya Sato et al., Information Processing Society of Japan Technical Reports, IPSJ, vol. 28, Mar. 15, 2002, pp. 119-126.
Office Action from U.S. Appl. No. 12/501,256, dated Sep. 21, 2010, 11 pages.
Office Action from U.S. Appl. No. 12/501,256, dated Mar. 15, 2011, 24 pages.

\* cited by examiner

SYSTEMS AND METHODS FOR IMPROVING THE RANKING OF NEWS ARTICLES

RELATED APPLICATIONS

This application is a continuation of U.S. patent application Ser. No. 14/140,108, filed on Dec. 24, 2013, which is a continuation of U.S. patent Ser. No. 13/616,659, filed on Sep. 14, 2012 (now U.S. Pat. No. 8,645,368), which is a continuation of U.S. patent application Ser. No. 13/404,827, filed Feb. 24, 2012, (now U.S. Pat. No. 8,332,382), which is continuation of U.S. patent application Ser. No. 12/501,256, filed on Jul. 10, 2009, (now U.S. Pat. No. 8,126,876), which is a continuation of U.S. patent application Ser. No. 10/662,931, filed Sep. 16, 2003, (now U.S. Pat. No. 7,577,655), the disclosures of which are hereby incorporated by reference herein.

FIELD OF THE INVENTION

The present invention relates generally to communication systems and, more particularly, to systems and methods for improving the ranking of news articles in a communications system.

BACKGROUND OF THE INVENTION

Networks, such as the Internet, have become an increasingly important part of our everyday lives. Millions of people now access the Internet on a daily basis to shop for goods and services, obtain information of interest (e.g., movie listings, news, etc.), and communicate with friends, family, and co-workers (e.g., via e-mail or instant messaging).

Currently, when a person wishes to purchase a product or simply find information on the Internet, the person enters into his/her web browser a Uniform Resource Locator (URL) pertaining to a web site of interest in order to access that particular web site. The person then determines whether the information of interest is available at that particular web site.

For example, suppose a person wishes to obtain the latest news regarding a particular topic via the Internet. The person accesses a web site that includes a conventional search engine. The person enters one or more terms relating to the topic of interest, such as "Iraq," into the search engine to attempt to locate a news source that has published an article relating to the topic. Using a search engine in this manner to locate individual web sites that provide news articles relating to the desired topic often results in a ranked list of hundreds or even thousands of "hits," where each hit may correspond to a web page that relates to the search term(s).

While each of the hits in the ranked list may relate to the desired topic, the news sources associated with these hits, however, may not be of uniform quality. For example, CNN and BBC are widely regarded as high quality sources of accuracy of reporting, professionalism in writing, etc., while local news sources, such as hometown news sources, may be of lower quality.

Therefore, there exists a need for systems and methods for improving the ranking of news articles based on the quality of the news source with which the articles are associated.

SUMMARY OF THE INVENTION

Implementations consistent with the principles of the invention adjust the ranking of news articles in search results based at least in part on the quality of the news sources with which the articles are associated.

In accordance with one implementation consistent with the principles of the invention, a method for ranking results is provided. The method includes receiving a list of links, identifying, for each of the links, a source with which the link is associated, and ranking the list of links based at least in part on a quality of the identified sources.

In another implementation consistent with the principles of the invention, a server includes a processor and a memory that is configured to store quality indicators for a group of sources. The processor may receive a list of objects, identify a source with which each of the objects is associated, and rank at least one object in the list of objects based at least in part on the quality indicator associated with the source with which the one object is associated.

In a further implementation consistent with the principles of the invention, a method for determining a quality of a news source is provided. The method may include determining one or more metric values for the news source based at least in part on at least one of a number of articles produced by the news source during a first time period, an average length of an article produced by the news source, an amount of important coverage that the news source produces in a second time period, a breaking news score, an amount of network traffic to the news source, a human opinion of the news source, circulation statistics of the news source, a size of a staff associated with the news source, a number of bureaus associated with the news source, a number of original named entities in a group of articles associated with the news source, a breadth of coverage by the news source, a number of different countries from which network traffic to the news source originates, and the writing style used by the news source. The method may further include calculating a quality value for the news source based at least in part on the determined one or more metric values.

In yet another implementation consistent with the principles of the invention, a method for providing search results is provided. The method may include receiving a list of objects; identifying a source with which each of the objects in the group of objects is associated; determining a quality of each of the identified sources; and ranking each object in the group of objects based at least in part on the determined quality of the source with which the object is associated.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Implementations consistent with the principles of the invention improve the ranking of news articles in search results based at least in part on the quality of the sources associated with the news articles. While the foregoing description focuses on the ranking of news articles from news sources, it will be appreciated that the techniques described herein are equally applicable to improving the ranking of items other than news articles.

Exemplary System

Figure 1:
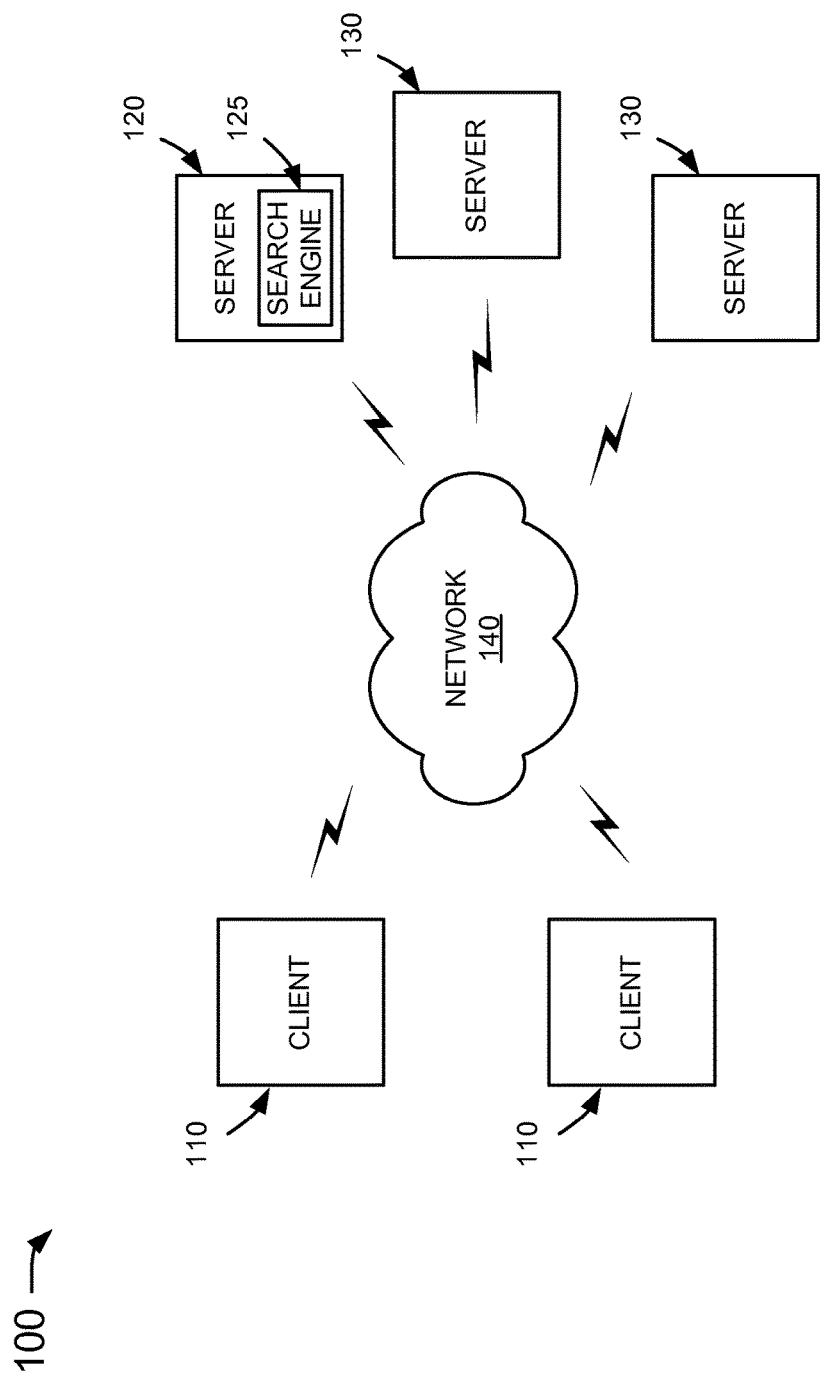
FIG. 1 is an exemplary diagram of a system in which systems and methods consistent with the principles of the invention may be implemented.

FIG. 1 is an exemplary diagram of a system 100 in which systems and methods consistent with the principles of the invention may be implemented. System 100 may include multiple clients 110 connected to servers 120 and 130 via a network 140. Network 140 may include a local area network (LAN), a wide area network (WAN), a telephone network, such as the Public Switched Telephone Network (PSTN), an intranet, the Internet, a similar or dissimilar network, or a combination of networks. Two clients 110 and three servers 120/130 have been illustrated as connected to network 140 in FIG. 1 for simplicity. In practice, there may be more or fewer clients 110 and/or servers 120/130. Also, in some instances, a client 110 may perform the functions of a server 120/130 and a server 120/130 may perform the functions of a client 110.

Clients 110 may include devices, such as wireless telephones, personal computers, personal digital assistants (PDAs), lap tops, etc., threads or processes running on these devices, and/or objects executable by these devices. Servers 120/130 may include server devices, threads, and/or objects that operate upon, search, or maintain documents in a manner consistent with the principles of the invention. Clients 110 and servers 120/130 may connect to network 140 via wired, wireless, or optical connections.

In an implementation consistent with the principles of the invention, server 120 may include a search engine 125 usable by clients 110. Servers 130 may store objects (or web documents) accessible by clients 110.

Exemplary Server Configuration

Figure 2:
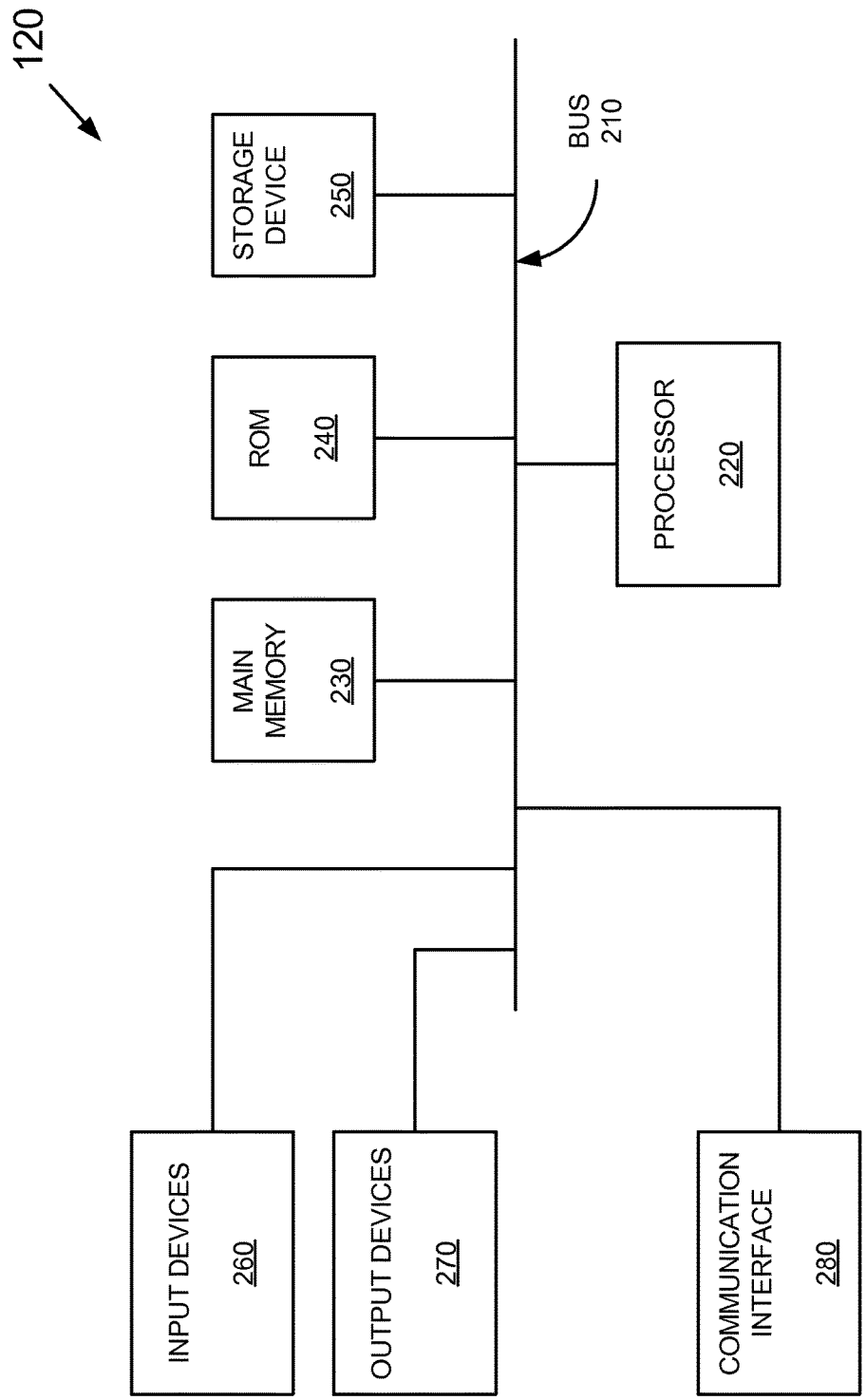
FIG. 2 is an exemplary diagram of the server of FIG. 1 in an implementation consistent with the principles of the invention.

FIG. 2 is an exemplary diagram of server 120 in an implementation consistent with the principles of the invention. Clients 110 and servers 130 may be similarly configured. Server 120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of server 120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input devices 260 may include one or more conventional mechanisms that permit a user to input information to server 120, such as a keyboard, a mouse, a pen, one or more biometric mechanisms, such as a voice recognition device, etc. Output devices 270 may include one or more conventional mechanisms that output information to the user, including a display, a printer, a speaker, etc. Communication interface 280 may include any transceiver-like mechanism that enables server 120 to communicate with other devices and/or systems. For example, communication interface 280 may include mechanisms for communicating with another device or system via a network, such as network 140.

As will be described in detail below, server 120, consistent with the principles of the invention, may provide search results in response to a query from a client 110. In one implementation, server 120 modifies news article search results based on the quality of the source providing the news article. Server 120 may perform these operations in response to processor 220 executing software instructions contained in a computer-readable medium, such as memory 230. A computer-readable medium may be defined as one or more memory devices and/or carrier waves. The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, the invention is not limited to any specific combination of hardware circuitry and software.

A server 120, consistent with the principles of the invention, may rank or alter a ranking of search results based on information from one or more associated databases. The databases may be stored at server 120 (e.g., in memory 230) or externally from server 120.

Figure 3:
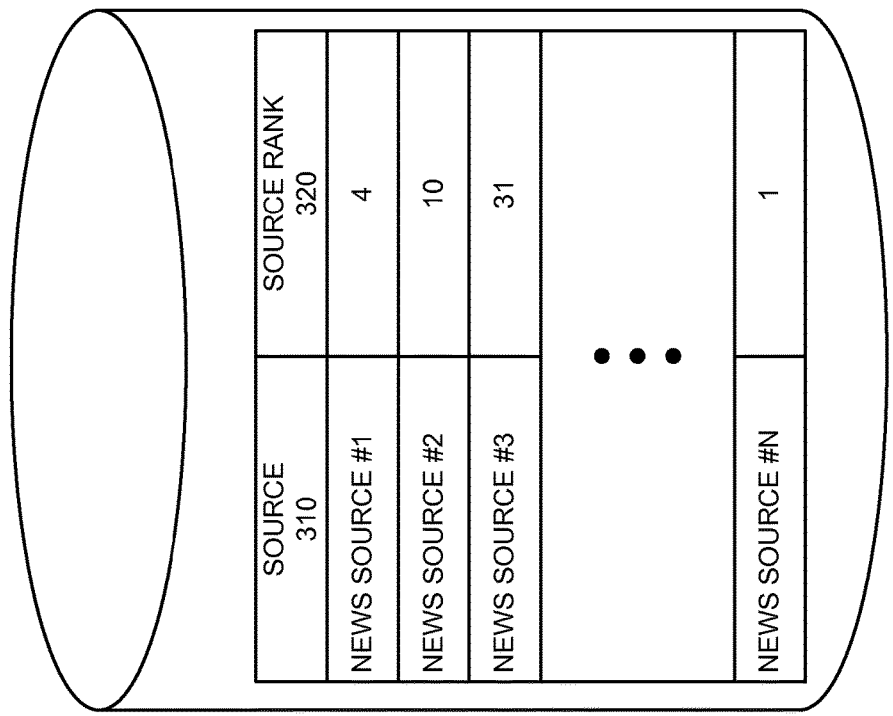
FIG. 3 is an exemplary diagram of a database that may be associated with the server of FIG. 2 in an implementation consistent with the principles of the invention.

FIG. 3 is an exemplary diagram of a database 300 that may be associated with server 120 in an implementation consistent with the principles of the invention. While only one database is described below, it will be appreciated that server 120 may be associated with one or more additional databases (not shown) stored locally at server 120 or distributed throughout network 140.

As illustrated, database 300 may include a source field 310 and a source rank field 320. Database 300 may include additional fields (not shown) that aid in searching and sorting information in database 300 and/or information retrieved from network 140.

Source field 310 may identify news sources in system 100. The news sources, labeled 1 through N, where N is a number greater than or equal to 1, may include local news sources, such as local on-line newspapers or local television station web sites, national news sources, international news sources, specialty news sources (e.g., technical, sports, or entertainment magazines or newspapers), and/or any other type of source of news from a network, such as the Internet. For example, the news sources may include on-line versions of the Washington Post, CNN, MSNBC, BCC, the New York Post, USA Today, the Pittsburgh Post-Gazette, ESPN, Sports Illustrated, and the like.

Source rank field 320 may store a value that may be used to adjust the ranking of articles (or documents) retrieved from the source identified in source field 310. In this way, the ranking of an article from a higher quality news source may be adjusted to be higher than an article on the same topic from a lower quality news source. As will be described in detail below, the value of a given news source may be based at least in part on the credibility, accuracy of reporting, professionalism in writing, etc. of the news source.

Exemplary Processing

Figure 4:
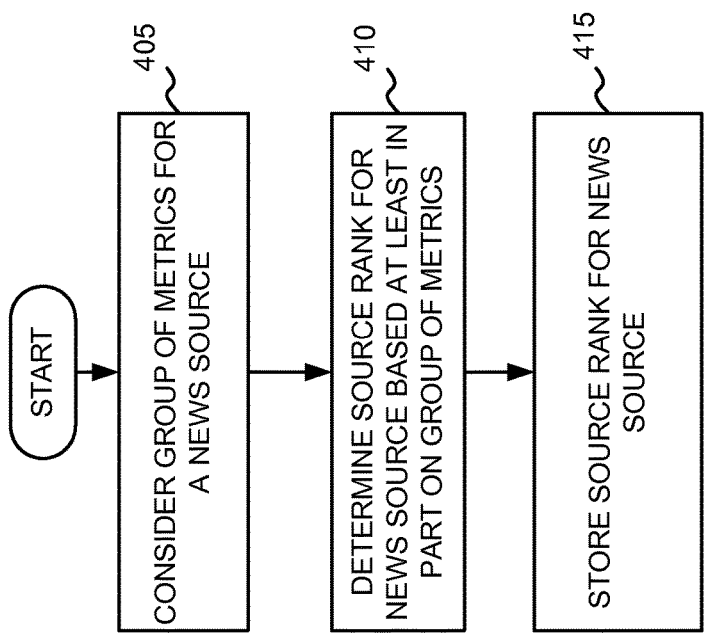
FIG. 4 is a flow chart of an exemplary process for determining a source rank for news sources in an implementation consistent with the principles of the invention.

FIG. 4 is a flow chart of an exemplary process for determining a source rank for news sources in an implementation consistent with the principles of the invention. The process described below may be performed automatically by, for example, server 120 or manually by a human operator. In alternative implementations, parts of the process described below may be performed automatically while other parts may be performed manually.

Processing may begin by considering a group of metrics for each news source (act 405). Each metric may measure a specific attribute of the news source that can serve as a partial indicator of the quality of the news source. In one implementation consistent with the principles of the invention, each metric may be computed as a numerical value, where, for example, a higher computed value may indicate a higher quality news source.

As will be described in greater detail below, the group of metrics may include the number of articles produced by the news source during a given time period, an average length of an article from the news source, the importance of coverage from the news source, a breaking news score, usage pattern, human opinion, circulation statistics, the size of the staff associated with the news source, the number of news bureaus associated with the news source, the number of original named entities the source news produces within a cluster of articles, the breath of coverage, international diversity, writing style, and the like. A first metric in determining the quality of a news source may include the number of articles produced by the news source during a given time period. The time period may be a week, bi-week, month, or the like. In one implementation consistent with the principles of the invention, the first metric may be determined by counting the number of non-duplicate articles produced by the news source over the time period. In an alternate implementation, the first metric may be determined by counting the number of original sentences produced by the news source.

A second metric may include an average length of an article from the news source. The average length may be measured, for example, in words or sentences. In one implementation consistent with the principles of the invention, the second metric may be determined by determining the average length of non-duplicate articles produced by the news source. For example, it may be determined that the average length of an article from CNN is 300 words, while the average article length from Amateur News Network is 150 words. Therefore, the value of the second metric for CNN may be 300 and for Amateur News Network may be 150.

A third metric may include the importance of coverage by the news source. This metric may be based at least in part on the assumption that the "size" of the underlying news story (referred to hereinafter as "story size") for a given article can be determined. This metric may be a total value that represents the story size scores for all non-duplicate articles produced by the news source under consideration during a fixed time period. The time period may be a week, bi-week, month, or the like. As an example, if D is an article, then the story size of D can be measured as the number of distinct other articles known to the system (e.g., server 120) that are on the same subject. For example, if D is an article about the crash of the Columbia Shuttle and there were 500 other distinct articles on the subject, then the story size would be 500. A number of techniques exist for detecting other articles on the story. For example, two such techniques are described in copending, commonly assigned, U.S. Patent Application 60/412,326, filed Jun. 30, 2003, and entitled "Methods and Apparatus for Ranking Documents," and U.S. Patent Application 60/412,287, filed Jun. 30, 2003, and entitled "Methods and Apparatus for Clustered Aggregation of News Content," both of which are expressly incorporated by reference in their entireties herein. A group of related articles is referred to hereinafter as a "cluster." In one implementation consistent with the principles of the invention, the metric value may be restricted to the story sizes of the biggest N stories, where N is a positive integer greater than or equal to 1, covered by the given source over the stipulated time period (e.g., the biggest 100 stories during 1 week covered by CNN as measured by server 120).

A fourth metric may include a value representative of a breaking news score. This metric may measure the ability of the news source to publish a story soon after an important event has occurred. This metric may average the "breaking score" of each non-duplicate article from the news source, where, for example, the breaking score is a number that is a high value if the article was published soon after the news event happened and a low value if the article was published after much time had elapsed since the news story broke.

In one implementation consistent with the principles of the invention, all articles in the cluster are sorted by publication time in increasing order and the first article's time is taken as the time of the event. For example, assume T is the difference in time between the current article and the first article. A threshold N1 may be used to denote the interval after which a story is no longer considered breaking. Therefore, the breaking news score metric may be determined as:

If T>N1, then breaking_score=0;
If 0<T≤N1, then breaking_score=log(N1/T); and
If T=0, then breaking_score=log(N1).

N1 may be represented in hours, such as 3 hours.

In another implementation consistent with the principles of the invention, all articles in the cluster are sorted by time in increasing order and the rank of each article is taken as the value T above. Correspondingly, a threshold N2 may be used. Therefore, the breaking news score metric may be determined as:

If T>N2, then breaking_score=0; and
If 1<T≤N2, then breaking_score=log(N2/T).

In one exemplary implementation, N2 may be 10.

In yet another implementation consistent with the principles of the invention, the breaking news score determined above may be multiplied by a quantity proportional to the size of the cluster of related articles to which the given article belongs. For example, the breaking news score may be multiplied by a factor=(1+log(cluster size)). This emphasizes the value of breaking news when the story is important and is seen to form a big cluster.

In still another implementation, instead of averaging the breaking score values, the values are summed if the cluster size is larger than a predetermined value (e.g., 30). Therefore, in this situation, the breaking news score may be determined as follows:

For each article A:
    If (Size(Cluster(A))>30):
        breaking_news[Source(A)]+=30−rank_within_cluster(A).

A fifth metric may include a value representing a usage pattern. Links going from the news search engine's web page to individual articles may be monitored for usage (e.g., clicks). News sources that are selected often are detected and a value proportional to observed usage is assigned. Well known sites, such as CNN, tend to be preferred to less popular sites, such as Unknown Town News, which users may avoid. The traffic measured may be normalized by the number of opportunities readers had of visiting the link to avoid biasing the measure due to the ranking preferences of the news search engine.

A sixth metric may include a value representing human opinion of the news source. In one implementation consistent with the principles of the invention, users in general may be polled to identify the newspapers (or magazines) that the users enjoy reading (or have visited). Alternatively or in addition, users of the news search engine may be polled to determine the news web sites that the users enjoy visiting. The evaluation of news sites by other agencies may be also used (e.g., newspapers can be compared based at least in part on the number of Pulitzer prizes the newspapers have won, etc.). Moreover, the age of the news source may be taken as a measure of confidence by the public and may be used as a metric. In another implementation, evaluators may be shown a selection of articles from individual news sources and asked to assign each source a score. This assigned score may be taken as a metric.

A seventh metric may include a value representing circulation statistics of the news source. Agencies, such as Media Metrix and Nielsen Netratings, publish usage statistics for on-line sites (e.g., news sites). These published traffic numbers can be used as a measure of the quality of a news source. In one implementation consistent with the principles of the invention, the circulation statistics of a print newspaper associated with the news site may be taken as a metric.

An eighth metric may include a value representing the size of the staff associated with the news source. In one implementation consistent with the principles of the invention, the staff size may be determined based at least in part on the number of distinct journalist names recited in articles from the news source.

A ninth metric may include a value representing the number of news bureaus associated with the news source.

A tenth metric may include a value representing the number of original named entities the news source produces within a cluster of related articles, averaged, for example, over all articles that have at least N related articles (e.g., N=3). A named entity may correspond to a person, place, or organization. If a news source generates a news story that contains a named entity that other articles within the same cluster (hence on the same topic) do not contain, this may be an indication that the news source is capable of original reporting. In this analysis, the average value added by the given news source in a cluster of a threshold size N is evaluated. In one implementation consistent with the principles of the invention, the named entities may be considered if no earlier article in the cluster has the same named entity. Named entities may be compared using approximate string matching to compensate for variations in spelling and abbreviation. Named entities that are markedly different from those in other articles may be considered as original.

An eleventh metric may include a value representing breadth (e.g., the number of topics on which the source produces content) of the news source. In one implementation consistent with the principles of the invention, articles from the news source may be categorized into a set of topics (e.g., arts, music, sports, business, etc.) and the range of topics may be used as a measure of breadth. Any conventional classification technique can be used for categorizing articles into topics. For example, a classification system from the Machine learning literature can be used to classify news articles into a chosen set of topics. In another implementation, the number of sections published by the news source may be taken as a measure of breadth.

A twelfth metric may include a value representing international diversity of the news source. This metric may measure the number of countries from which the news site receives network traffic. In one implementation consistent with the principles of the invention, this metric may be measured by considering the countries from which known visitors to the news web site are coming (e.g., based at least in part on the Internet Protocol (IP) addresses of those users that click on the links from the search site to articles by the news source being measured). The corresponding IP addresses may be mapped to the originating countries based on a table of known IP block to country mappings. In another implementation, the IP addresses of web sites which link to the given news web site may be monitored and the number of distinct countries from which the news site is linked may be used as the metric.

A thirteenth metric may include a value representing the writing style used by the news source. Automated tests for measuring spelling correctness, grammar, and reading levels can be used to generate a metric value that reflects writing style. A score proportional to the measured quality of writing style may then be assigned.

It will be appreciated that other metrics may be considered in addition to or as an alternative to the above group of metrics. For example, another metric may include a value representing the number of hyperlinks to the news web site.

Once a group of metrics has been considered, a source rank for each of the news sources may be determined based at least in part on the group of metrics (act 410). To determine the source rank for a news source, some or all of the group of metrics described above may be combined to produce a final score (i.e., source rank) for the news source. A number of techniques may be used to determine the source rank of the news sources. For example, in one implementation consistent with the principles of the invention, each metric may be multiplied by a corresponding factor and the resulting values may be totaled to give the source rank for the news source. Alternatively, each metric may be normalized to be in the range 0 to 1 and the resulting values may be totaled to give a final metric value (i.e., source rank). For example, the normalization may be accomplished by dividing each metric value by the maximum possible value assigned by that metric.

In another implementation, the average rank of the news source in various metrics may be computed. For example, if CNN has a rank of 1 in circulation statistics, a rank of 2 in international popularity, and a rank of 9 in the number of international bureaus, then considering only these metrics CNN has an average rank of $$(1+2+9)/3=4.$$

In still a further implementation, for each news source, the percentile score on each metric relative to the best news source for that metric may be used for determining the source rank for the news source. For example, if CNN has a rank of 2 for international popularity and BCC has the highest rank for that metric of 10, then CNN's percentile score for that metric may be 0.2.

As an alternative to the above, one of the techniques described above may be used with only the best N metrics for the given news source being considered. N may be a positive integer greater than or equal to one. In one implementation, N may be 5. By considering only the best N metrics for a given news source, this allows for incorporation of news sources for which some of the metrics have yet to be computed.

Once a source rank has been determined for a news source, the source rank may be stored by server 120 (act 415). In one implementation, server 120 may store the identity of the news source and corresponding source rank value in a database, such as database 300.

Figure 5:
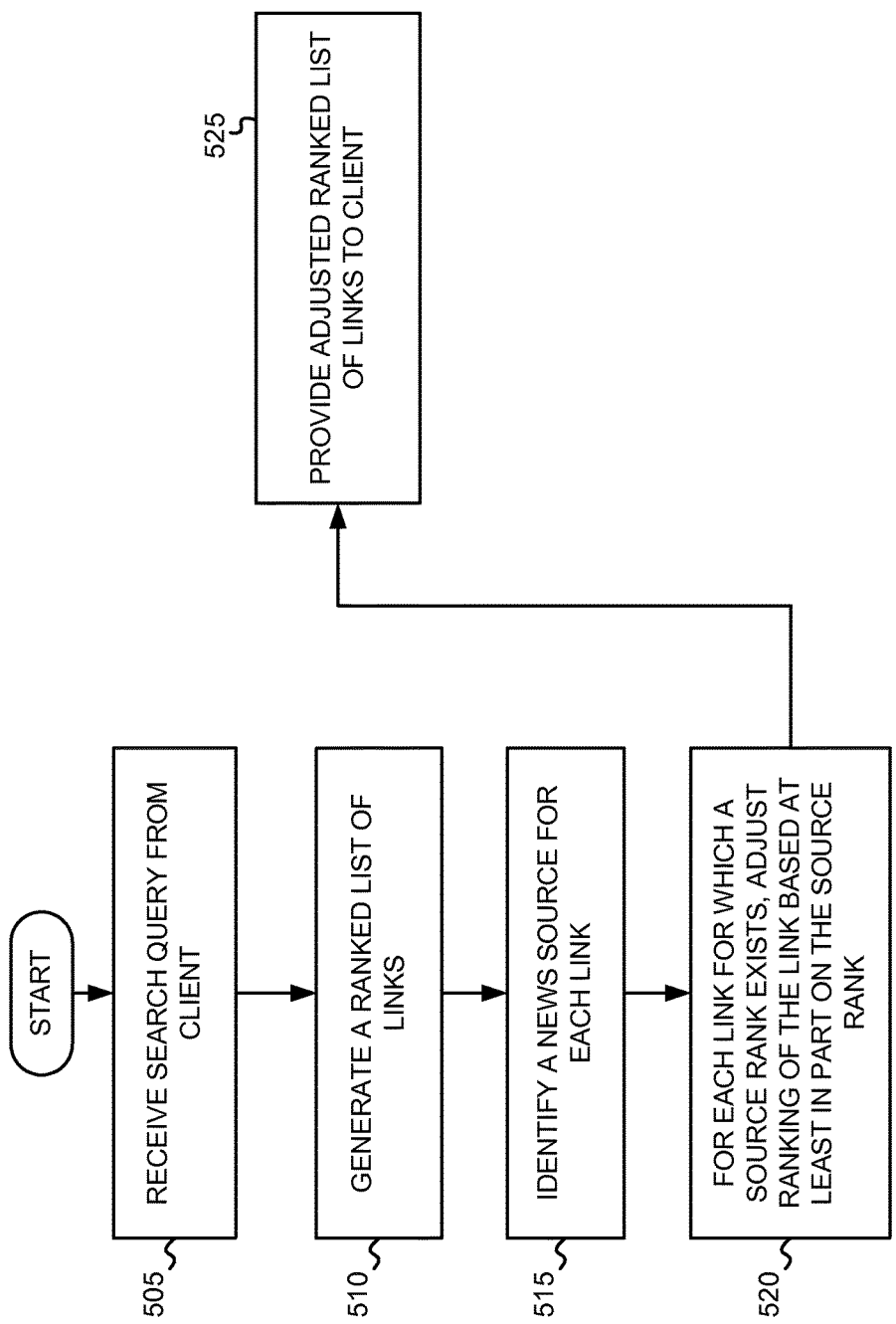
FIG. 5 is a flow chart of an exemplary process for adjusting a ranking of objects in an implementation consistent with the principles of the invention.

FIG. 5 is a flow chart of an exemplary process for adjusting a ranking of objects (e.g., news articles) in an implementation consistent with the principles of the invention. While the following description focuses on ranking objects retrieved as a result of a search query, implementations consistent with the principles of the invention are not so limited. In fact, implementations consistent with the principles of the invention are equally applicable to any system or method that ranks news articles according to a scoring criterion. The criterion can include, for example, a query (e.g., a search engine query, as described in the exemplary scenario below), a topic (e.g., sports), a list of keywords (e.g., keywords from an initial set of search result documents), a geographical area (e.g., New York), a list of articles in a cluster of articles, or an exemplary set of documents.

Processing may begin with a user accessing server 120 (FIG. 1) using, for example, web browser software on a client, such as client 110. The user may then provide a query that includes one or more search terms to search engine 125 maintained by server 120 (act 505). In one implementation, the search query includes one or more terms relating to a news topic. For example, if a user desired to view news articles about George Bush, the user may cause client 110 to send a search query to server 120 with the search terms "George Bush."

In response to receiving the search query, server 120 may generate a ranked list of results in a conventional manner (act 510). The results may include references (e.g., links) to news articles and possibly a textual description of the links. Server 120 may determine, for each link in the ranked list, whether the link corresponds to a news source for which a source rank has been determined. To determine whether a source rank exists for a link, server 120 may first identify the news source to which the link corresponds (act 515). In one implementation, server 120 may identify the news source based at least in part on the uniform resource locator (URL) associated with the link. For example, server 120 may determine that link "www.cnn.com/2003/abc/index.html," corresponds to the news source "CNN." Other techniques for identifying the news source to which a link corresponds may alternatively be used.

Once the news source has been identified, server 120 may determine whether a source rank exists for a link by, for example, accessing database 300 and determining whether the news source corresponding to the link is stored in source field 310 (act 520). If the news source does not exist in source field 310, server 120 may not adjust the ranking of the link. If, on the other hand, the news source exists in source field 310, server 120 may retrieve the source rank of the news source from source rank field 320. Server 120 may then adjust the ranking of the link corresponding to the news source based at least in part on the retrieved source rank (act 520).

Given an initial ranking R1 of links, server 120 may produce an adjusted ranking R2 by computing an improved score for each link. Server 120 may determine the new score by combining the score corresponding to the ranking in R1 with the source rank for the news source associated with the link. In one implementation consistent with the principles of the invention, server 120 may determine the new score as a weighted sum. For example, server 120 may determine the new score for a link as follows:

$$NEWSCORE(D)=alpha*OLDSCORE(D)+beta*SOURCERANK(SOURCE(D))$$

where SOURCE(D) is the news source of link D and alpha and beta are suitable constants. For example, in one implementation consistent with the principles of the invention, alpha may be set to 0.8 and beta may be set to 0.2. It will be appreciated that other values for alpha and beta may alternatively be used. Other techniques for adjusting the ranking of a link may alternatively be used, such as taking the average of the R1 score and the source rank. In this way, an improved ranking of news links may be produced.

Once the ranked list has been adjusted, server 120 may provide the adjusted ranked list of links to client 110 (act 525). Server 120 may transmit the adjusted list of links to client 110 via network 140.

In other implementations consistent with the principles of the invention, server 120 may, in act 510, retrieve a non-ranked list of results in response to receiving the search query. In such instances, server 120 may rank the list of results based on the source rank associated with the new sources with which the list of results is associated.

CONCLUSION

Implementations consistent with the principles of the invention may improve the ranking of news articles based at least in part on the quality of the news sources associated with the news articles.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, the above-described functions need not be performed by server 120. In other implementations, one or more of the acts described in FIG. 5 may be performed by a client 110. For example, a browser assistant (i.e., software that operates in conjunction with a conventional web browser) may perform one or more of the acts described with respect to the process of FIG. 5.

Moreover, as set forth above, implementations consistent with the principles of the invention are not limited to ranking news articles. For example, implementations consistent with the principles of the invention may be used for ranking other types of items that may be retrieved over a network or from one or more databases.

While series of acts have been described with regard to FIGS. 4 and 5, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed is:

1. A method for ranking results, comprising:
   receiving a list of objects;
   identifying a first object in the list and a first source with which the first object is associated;
   identifying a second object in the list and a second source with which the second object is associated;
   determining a quantity of named entities that (i) occur in the first object that is associated with the first source, and (ii) do not occur in objects that are identified as sharing a same cluster with the first object but that are associated with one or more sources other than the first source;
   computing, based at least on the quantity of named entities that (i) occur in the first object that is associated with the first source, and (ii) do not occur in objects that are identified as sharing a same cluster with the first object but that are associated with one or more sources other than the first source, a first quality value of the first source using a first metric, wherein a named entity corresponds to a person, place, or organization;
   computing a second quality value of the second source using a second metric that is different from the first metric; and
   ranking the list of objects based on the first quality value and the second quality value.

2. The method of claim 1 wherein the identifying the first source with which the first object is associated includes:
   identifying the first source based on a uniform resource locator (URL) associated with the first object.

3. The method of claim 1 wherein the first source is a news source.

4. The method of claim 1 wherein computing the first quality value of the first source is further based on:
   one or more of a number of articles produced by the first source during a first time period, an average length of an article produced by the first source, an amount of important coverage that the first source produces in a second time period, a breaking news score, network traffic to the first source, a human opinion of the first source, circulation statistics of the first source, a size of a staff associated with the first source, a number of bureaus associated with the first source, a breadth of coverage by the first source, a number of different countries from which traffic to the first source originates, and a writing style used by the first source.

5. The method of claim 1 wherein computing the first quality value of the first source is further based on a length of time between an occurrence of an event and publication of an article associated with the event by the first source.

6. The method of claim 1 wherein the objects include links to on-line news articles.

7. The method of claim 1 further comprising:
   determining the list of objects based at least in part on one or more of a search query, a topic, a list of one or more keywords, a geographical area, and a set of documents.

8. A system comprising:
   one or more computers and one or more storage devices storing instructions that are operable, when executed by the one or more computers, to cause the one or more computers to perform operations comprising:
   receiving a list of objects;
   identifying a first object in the list and a first source with which the first object is associated;
   identifying a second object in the list and a second source with which the second object is associated;
   determining a quantity of named entities that (i) occur in the first object that is associated with the first source, and (ii) do not occur in objects that are identified as sharing a same cluster with the first object but that are associated with one or more sources other than the first source;
   computing, based at least on the quantity of named entities that (i) occur in the first object that is associated with the first source, and (ii) do not occur in objects that are identified as sharing a same cluster with the first object but that are associated with one or more sources other than the first source, a first quality value of the first source using a first metric, wherein a named entity corresponds to a person, place, or organization;
   computing a second quality value of the second source using a second metric that is different from the first metric; and
   ranking the list of objects based on the first quality value and the second quality value.

9. The system of claim 8, wherein the identifying the first source with which the first object is associated includes:
   identifying the first source based on a uniform resource locator (URL) associated with the first object.

10. The system of claim 8, wherein the first source is a news source.

11. The system of claim 8, wherein computing the first quality value of the first source is further based on:
    one or more of a number of articles produced by the first source during a first time period, an average length of an article produced by the first source, an amount of important coverage that the first source produces in a second time period, a breaking news score, network traffic to the first source, a human opinion of the first source, circulation statistics of the first source, a size of a staff associated with the first source, a number of bureaus associated with the first source, a breadth of coverage by the first source, a number of different countries from which traffic to the first source originates, and a writing style used by the first source.

12. The system of claim 8, wherein computing the first quality value of the first source is further based on a length of time between an occurrence of an event and publication of an article associated with the event by the first source.

13. The system of claim 8, wherein the objects include links to on-line news articles.

14. The system of claim 8, wherein the operations comprise:
    determining the list of objects based at least in part on one or more of a search query, a topic, a list of one or more keywords, a geographical area, and a set of documents.

15. A computer program product, encoded on one or more non-transitory computer storage media, comprising instructions that when executed by one or more computers cause the one or more computers to perform operations comprising:
    receiving a list of objects;
    identifying a first object in the list and a first source with which the first object is associated;

identifying a second object in the list and a second source with which the second object is associated;

determining a quantity of named entities that (i) occur in the first object that is associated with the first source, and (ii) do not occur in objects that are identified as sharing a same cluster with the first object but that are associated with one or more sources other than the first source;

computing, based at least on the quantity of named entities that (i) occur in the first object that is associated with the first source, and (ii) do not occur in objects that are identified as sharing a same cluster with the first object but that are associated with one or more sources other than the first source, a first quality value of the first source using a first metric, wherein a named entity corresponds to a person, place, or organization;

computing a second quality value of the second source using a second metric that is different from the first metric; and ranking the list of objects based on the first quality value and the second quality value.

16. The product of claim 15, wherein the identifying the first source with which the first object is associated includes:

identifying the first source based on a uniform resource locator (URL) associated with the first object.

17. The product of claim 15, wherein the first source is a news source.

18. The product of claim 15, wherein computing the first quality value of the first source is further based on:

one or more of a number of articles produced by the first source during a first time period, an average length of an article produced by the first source, an amount of important coverage that the first source produces in a second time period, a breaking news score, network traffic to the first source, a human opinion of the first source, circulation statistics of the first source, a size of a staff associated with the first source, a number of bureaus associated with the first source, a breadth of coverage by the first source, a number of different countries from which traffic to the first source originates, and a writing style used by the first source.

19. The product of claim 15, wherein computing the first quality value of the first source is further based on a length of time between an occurrence of an event and publication of an article associated with the event by the first source.

20. The product of claim 15 wherein the objects include links to on-line news articles.

* * * * *